US012794972B1

(12) United States Patent
Allen

(10) Patent No.: US 12,794,972 B1
(45) Date of Patent: Nov. 10, 2026

(54) SYSTEM AND METHOD OF PROVIDING A CLOUD-SERVICE PROVIDER EXCHANGE

(71) Applicant: Adaptive Computing Enterprises, Inc., Naples, FL (US)

(72) Inventor: Arthur L. Allen, Naples, FL (US)

(73) Assignee: ADAPTIVE COMPUTING ENTERPRISES, INC., Naples, FL (US)

(*) Notice: Subject to any disclaimer, the term of this patent is extended or adjusted under 35 U.S.C. 154(b) by 0 days.

(21) Appl. No.: 18/596,820

(22) Filed: Mar. 6, 2024

(51) Int. Cl.

| | |
|---|---|
| ***G06F 15/16*** | (2006.01) |
| ***G06F 9/54*** | (2006.01) |
| ***G06Q 30/0201*** | (2023.01) |
| ***H04L 29/06*** | (2006.01) |
| ***H04L 47/70*** | (2022.01) |
| ***H04L 47/76*** | (2022.01) |
| ***H04L 67/1012*** | (2022.01) |

(52) U.S. Cl.
CPC ..... *H04L 67/1012* (2013.01); *G06Q 30/0206* (2013.01); *H04L 47/76* (2013.01); *H04L 47/822* (2013.01)

(58) Field of Classification Search
CPC ... H04L 67/1012; H04L 47/76; H04L 47/822; G06Q 30/0206
USPC ............................................................ 726/23
See application file for complete search history.

(56) References Cited

U.S. PATENT DOCUMENTS

| | | | | |
|---|---|---|---|---|
| 8,244,559 | B2 * | 8/2012 | Horvitz | G06F 9/5027 705/30 |
| 9,508,095 | B2 * | 11/2016 | Stella | H04L 67/14 |
| 9,699,114 | B1 * | 7/2017 | Hintermeister | G06F 9/5072 |
| 9,935,829 | B1 | 4/2018 | Miller | |
| 10,003,550 | B1 | 6/2018 | Babcock | |
| 10,678,602 | B2 * | 6/2020 | Manglik | G06F 8/61 |
| 10,877,796 | B1 | 12/2020 | Kinney, Jr. | |
| 12,008,649 | B1 | 6/2024 | Gordon, III | |
| 12,204,939 | B1 * | 1/2025 | Brown | G06F 11/3433 |
| 2003/0041011 | A1 * | 2/2003 | Grey | G06Q 40/04 705/37 |
| 2006/0212332 | A1 | 9/2006 | Jackson | |
| 2010/0076856 | A1 * | 3/2010 | Mullins | G06Q 30/0601 705/26.1 |
| 2010/0332262 | A1 * | 12/2010 | Horvitz | G06F 9/5072 705/26.1 |
| 2012/0095908 | A1 * | 4/2012 | Barrie | G06F 9/5038 705/39 |
| 2012/0131591 | A1 * | 5/2012 | Moorthi | G06F 9/5061 718/104 |
| 2012/0179824 | A1 | 7/2012 | Jackson | |

(Continued)

*Primary Examiner* — Hamza N Algibhah

(57) ABSTRACT

A system for operating a compute exchange includes at least one processor; and a computer-readable storage device storing instructions which, when executed by the at least one processor, cause the at least one processor to be configured to: receive, at the compute exchange, a request from a user for workload to be processed in a computing environment; obtain a price for processing the workload in one of a plurality of cloud service providers; receive, at the compute exchange, respective real-time pricing from respective cloud service providers for processing the workload; determine, at the compute exchange, a chosen cloud service provider based on the respective real-time pricing; and cause a portion of the workload to be processed on the chosen cloud service provider.

15 Claims, 5 Drawing Sheets

(56) References Cited

U.S. PATENT DOCUMENTS

| | | | | |
|---|---|---|---|---|
| 2012/0222041 | A1 | 8/2012 | Sabin | |
| 2012/0239739 | A1* | 9/2012 | Manglik | G06F 8/61 709/203 |
| 2013/0007753 | A1 | 1/2013 | Jain | |
| 2013/0124720 | A1 | 5/2013 | Wood | |
| 2013/0151298 | A1* | 6/2013 | Davis | G06Q 30/0621 705/7.14 |
| 2014/0068075 | A1* | 3/2014 | Bonilla | G06Q 30/00 709/226 |
| 2014/0278808 | A1* | 9/2014 | Iyoob | G06Q 30/0206 705/7.35 |
| 2014/0280961 | A1 | 9/2014 | Martinez | |
| 2014/0379924 | A1 | 12/2014 | Das | |
| 2015/0193796 | A1 | 7/2015 | Gerrity | |
| 2015/0242204 | A1 | 8/2015 | Hassine | |
| 2015/0341230 | A1 | 11/2015 | Dave | |
| 2015/0370601 | A1 | 12/2015 | Ghosh | |
| 2016/0048408 | A1 | 2/2016 | Madhu | |
| 2016/0105321 | A1 | 4/2016 | Thakkar | |
| 2016/0182397 | A1 | 6/2016 | McFarlin | |
| 2016/0236077 | A1* | 8/2016 | Baust | G06F 9/5027 |
| 2017/0109815 | A1* | 4/2017 | Bai | G06Q 30/08 |
| 2018/0152392 | A1* | 5/2018 | Reed | G06Q 10/0631 |
| 2018/0227240 | A1 | 8/2018 | Liu | |
| 2019/0079751 | A1 | 3/2019 | Foskett | |
| 2019/0130327 | A1 | 5/2019 | Carpenter | |
| 2019/0147089 | A1 | 5/2019 | Megahed | |
| 2019/0155643 | A1* | 5/2019 | Bhageria | H04L 9/008 |
| 2019/0258513 | A1 | 8/2019 | Poort | |
| 2019/0312795 | A1 | 10/2019 | Ķarve | |
| 2019/0378078 | A1* | 12/2019 | Áristeía-Æsír | G06Q 10/063112 |
| 2020/0073708 | A1* | 3/2020 | Chakra | G06F 9/5083 |
| 2020/0153921 | A1* | 5/2020 | Kolluri Venkata Sesha | H04L 67/10 |
| 2020/0225990 | A1* | 7/2020 | Vaddi | G06F 9/455 |
| 2020/0314174 | A1* | 10/2020 | Dailianas | G06F 9/45558 |
| 2020/0314175 | A1* | 10/2020 | Dailianas | G06Q 30/0283 |
| 2020/0387357 | A1 | 12/2020 | Mathon | |
| 2022/0198369 | A1 | 6/2022 | Oyamada | |
| 2022/0237688 | A1 | 7/2022 | Teh | |
| 2024/0062879 | A1* | 2/2024 | Stranjak | G06N 5/043 |
| 2025/0166033 | A1 | 5/2025 | Negron-Moreno | |
| 2025/0378493 | A1 | 12/2025 | Choi | |

* cited by examiner

SYSTEM AND METHOD OF PROVIDING A CLOUD-SERVICE PROVIDER EXCHANGE

CROSS-REFERENCE TO RELATED APPLICATIONS

The present application is related to U.S. application Ser. No. 17/545,149, filed on Dec. 8, 2021, the contents of which are incorporated herein by reference. The present application is related to U.S. application Ser. No. 18/596,705, U.S. application Ser. No. 18/596,718, U.S. application Ser. No. 18/596,734, and U.S. application Ser. No. 18/596,775, all filed on the same day as the present application, the contents of which are incorporated herein by reference.

FIELD OF THE INVENTION

The present application relates to providing a multi-cloud-compute-exchange in which users could submit workload to the exchange and receive real-time pricing and accessibility to multiple cloud/infrastructure providers and then submit the workload for processing in the most cost-effective cloud/infrastructure provider, which could include the use of local on-premises compute resources.

BACKGROUND

Accessing cloud service providers such as (Oracle Cloud Infrastructure), AWS (Amazon Web Services), Google Cloud, Azure, OTC (Open Telekom Cloud), Alibaba, high performance computing (HPC) CloudMart, VMware, and/or OpenStack can be challenging. Users must proceed through a complicated user interface to select the service provider, identify or configure the compute resources and get the compute resources deployed so that they can utilize them.

Users typically will need to create an account at the various cloud service providers and if they desire to select one with the best pricing or availability, they must go into each account separately and use a console, command line interface, or other software development kid to create and configure the resources that they need.

BRIEF SUMMARY

There are inefficiencies in the process described above.

The present disclosure introduces a compute exchange in which users can access the compute exchange to provide their workload that requires compute resources. The compute exchange can be in communication with a plurality of cloud service providers and can receive real-time pricing data for each respective cloud service provider. Users can provide pricing as an "ask" in the context of a bid-ask framework similar to the stock market. The respective cloud service providers can provide the real time pricing data or respond to access the asking price and from the compute exchange, a chosen cloud service provider can be selected and the workload can then flow to the chosen cloud service provider for processing.

In some aspects, the techniques described herein relate to a method including: receiving, at a compute exchange, a request from a user for workload to be processed in a computing environment; obtaining a price for processing the workload in one of a plurality of cloud service providers; receiving, at the compute exchange, respective real-time pricing from respective cloud service providers for processing the workload; determining, at the compute exchange, a chosen cloud service provider based on the respective real-time pricing; and causing a portion of the workload to be processed on the chosen cloud service provider.

In some aspects, the techniques described herein relate to a system for operating a compute exchange, the system including: at least one processor; and a computer-readable storage device storing instructions which, when executed by the at least one processor, cause the at least one processor to be configured to: receive, at the compute exchange, a request from a user for workload to be processed in a computing environment; obtain a price for processing the workload in one of a plurality of cloud service providers; receive, at the compute exchange, respective real-time pricing from respective cloud service providers for processing the workload; determine, at the compute exchange, a chosen cloud service provider based on the respective real-time pricing; and cause a portion of the workload to be processed on the chosen cloud service provider.

In some aspects, the techniques described herein relate to a computer-readable storage device storing instructions which, when executed by at least one processor, cause the at least one processor to be configured to: receive, at a compute exchange, a request from a user for workload to be processed in a computing environment; obtain a price for processing the workload in one of a plurality of cloud service providers; receive, at the compute exchange, respective real-time pricing from respective cloud service providers for processing the workload; determine, at the compute exchange, a chosen cloud service provider based on the respective real-time pricing; and cause a portion of the workload to be processed on the chosen cloud service provider.

In some aspects, the techniques described herein relate to a compute exchange including: means for receiving, at the compute exchange, a request from a user for workload to be processed in a computing environment; means for obtaining a price for processing the workload in one of a plurality of cloud service providers; means for receiving, at the compute exchange, respective real-time pricing from respective cloud service providers for processing the workload; means for determining, at the compute exchange, a chosen cloud service provider based on the respective real-time pricing; and means for causing a portion of the workload to be processed on the chosen cloud service provider.

In some aspects, the techniques described herein relate to a method including: transmitting, from a cloud service provider and to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; when the cloud service provider is the chosen cloud service provider based on the real-time pricing data or an acceptance of the price, receiving, from the compute exchange, instructions to deploy compute resources to process the workload; deploying, based on the instructions, the compute resources to yield deployed compute resources; and processing a portion of the workload on the deployed compute resources.

In some aspects, the techniques described herein relate to a system for operating a cloud service provider, the system including: at least one processor; and a computer-readable storage device storing instructions which, when executed by the at least one processor, cause the at least one processor to be configured to: transmit, from a cloud service provider and to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; when the cloud service provider is the chosen cloud service provider based on the real-time pricing data or an acceptance of the price, receive, from the compute exchange, instructions to deploy compute resources to process the workload; deploy, based on the instructions, the compute resources to yield deployed compute resources; and process a portion of the workload on the deployed compute resources.

In some aspects, the techniques described herein relate to a computer-readable storage device storing instructions which, when executed by at least one processor associated with a cloud service provider, cause the at least one processor to be configured to: transmit, to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; when the cloud service provider is the chosen cloud service provider based on the real-time pricing data or an acceptance of the price, receive, from the compute exchange, instructions to deploy compute resources to process the workload; deploy, based on the instructions, the compute resources to yield deployed compute resources; and process a portion of the workload on the deployed compute resources.

In some aspects, the techniques described herein relate to a cloud service provider including: means for transmitting, to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; means for, when the cloud service provider is the chosen cloud service provider based on the real-time pricing data or an acceptance of the price, receiving, from the compute exchange, instructions to deploy compute resources to process the workload; means for deploying, based on the instructions, the compute resources to yield deployed compute resources; and means for processing a portion of the workload on the deployed compute resources.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
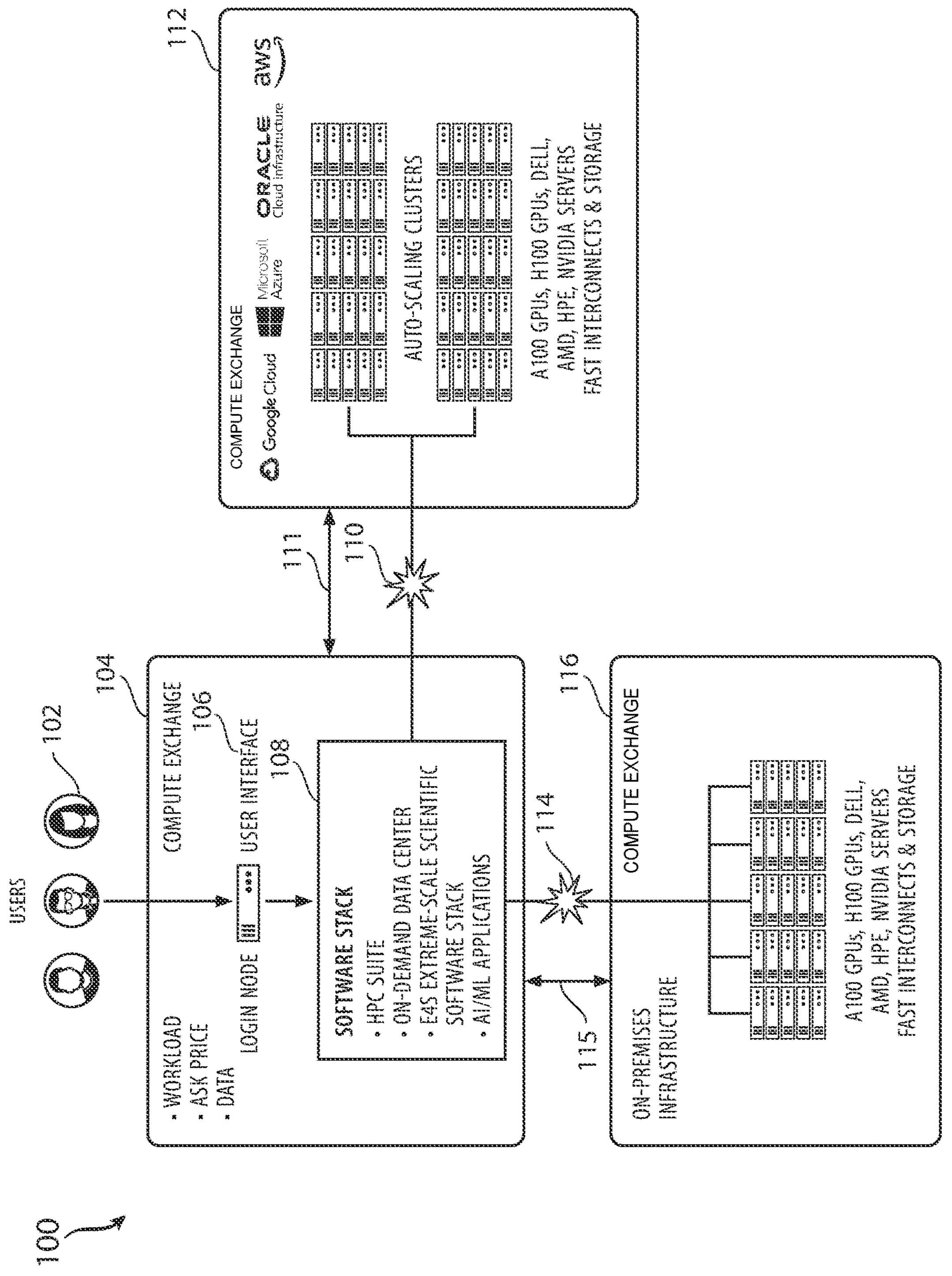
FIG. 1 illustrates a block diagram of a compute exchange, according to some aspects of this disclosure.

As noted above, the current state of accessing cloud service providers is inefficient and can be expensive. There is no mechanism that enables users to compare pricing for their workloads across different providers.

This disclosure introduces a compute exchange that can enable users through one interface to submit workload or workload requests and obtain real-time pricing data from a plurality of cloud service providers and enables the user or the compute exchange to pick a chosen cloud service provider and then facilitate the deployment of compute resources by the chosen cloud service provider for processing the workload.

FIG. illustrates a cloud service provider network 100 that can include features such as a set of users 102 that access a compute exchange interface 104 that provides a user interface 106 for the users 102 to be able to access compute resources in one or more compute environments such as an on-premises infrastructure 116 and/or a cloudmart (which is also labeled as a compute exchange) 112 which can provide compute resources from a plurality of cloud service providers such as Google Cloud, Microsoft Azure, Oracle Cloud Infrastructure and Amazon Web Services (AWS). Any other cloud service providers can be included as well. The compute exchange 204 can receive various items from the users. For example, users 102 can, via a graphical user interface or a command line, provide workload, request for processing workload, other data such as characteristics of the workload, parameters or quality of service requirements (i.e., timing, number of nodes/cores, time to start, time to finish, etc.) and so forth. The users 102 may also provide a price for the compute resources to process their workload. The price can be the maximum amount the user 102 is willing to pay for the compute resources to process their workload. The price can be characterized as a bid price from the buyer or the user 102.

The cloudmart 112 can include compute resources such as, by way of example, A100 GPUs (graphical processing units), H100 GPUs, Dell, AMD (Advanced Micro Devices), HPE (Hewlett Packard Enterprise), NVIDIA Servers, Fast interconnects and storage components. The ability to autoscale up clusters is included in the cloudmart 112.

The "compute exchange" can represent any one or more of the components disclosed in FIG. 1 including the compute exchange interface 104, the cloudmart 112 and/or the on-premises infrastructure 116.

The compute exchange interface 104 can include a variety of software components 108 to make the exchange work. These can include one or more of a high-performance computing suite (such as the Moab HPC Suite from Adaptive Computing), an on-demand data center, E4S extreme-scale scientific software stack and/or applications such as artificial intelligence or machine learning applications. The E4S extreme-scale scientific software stack is a community effort to provide open source software packages for developing, deploying and running scientific applications on HPC and AI platforms. The compute exchange interface 104 can be in communication via a communication channel 111 with the cloudmart 112. The cloudmart 112 can include the plurality of cloud service providers which can determine real time asking prices for their compute resources. For example, via the communication channel 111, each respective cloud service provider can provide real-timing pricing information for their compute resources. The real-time pricing can be based on a number of factors such as the demand for the compute resources for that particular cloud service provider, the supply of compute resources, the timing of the need for resources such as immediately or at a future scheduled time, or for a range of times, the type of hardware or virtual compute resources that are available, and so forth.

In some aspects, the "compute exchange" can be defined as one or more of the software and hardware components of compute exchange interface 104, plus the various software and hardware components of the cloudmart 112 and/or the on-premises infrastructure 116. All of these components may be considered the compute exchange as they include the management and user interface aspects of the compute exchange interface 104 plus the use of compute resources from the cloudmart 112 and/or the on-premises infrastructure 116.

The compute exchange interface 104 can also be in communication with an on-premises infrastructure 116 that can include compute resources such as, by way of example, A100 GPUs (graphical processing units), H100 GPUs, Dell, AMD (Advanced Micro Devices), HPE (Hewlett Packard Enterprise), NVIDIA Servers, Fast interconnects and storage components.

Status data about the on-premises infrastructure 116 can be provided to the compute exchange interface 104 through a communication link 115. The status data can be real-time and be related to the availability of compute resources within the on-premises infrastructure 116. In this regard, the compute exchange interface 104 can utilize knowledge about the availability of compute resources in the on-premises infrastructure 116 when making decisions regarding where to process workload received by users 102.

For example, the compute exchange interface 104 may get a request for processing workload from a user and a bid price of $100. The data received from the cloud service providers might indicate that the best offer for that workload (given its characteristics, quality of service requirements, etc.) might be $115 from AWS. In some aspects, the user can be given the opportunity to accept the pricing of AWS at $115 and commit the workload to be processed by AWS. Then the workload can be burst 110 into AWS as the cloud service provider for processing. The compute exchange interface 104 can provide all the necessary instructions for deployment, processing, and destroying or tearing down deployed compute nodes or clusters in the cloud service provider. Furthermore, there is no restriction on the workload being services by a single cloud service provider. The workload may be divided into portions that can be processed in difference compute environments between the on-premises infrastructure 116 and one or more cloud service providers.

In another aspect, perhaps there is sufficient compute resources in the on-premises infrastructure 116 and because the offer from AWS was more than the bid price of $100, then compute exchange interface 104 can burst 114 the workload into the on-premises infrastructure 116 or may just process the workload on the on-premises infrastructure 116. As noted above, the workload may also be divided between the on-premises infrastructure 116 and one or more cloud service provider. The division may be based on price, a characteristic of the compute resources, a timing of when compute resources are available, and so forth. The workload may be divided also by portions that have different processing characteristics (high data intensive versus high processing requirements) and two or three or more different portions could be processed by different compute environments. In this manner, users can efficiently obtain compute resources at the best price or under the best circumstances even if it is not the best price. For example, users might be wiling to pay more than a bid price for compute resources that are available sooner or that are of higher quality or that provide a better guarantee.

Figure 2:
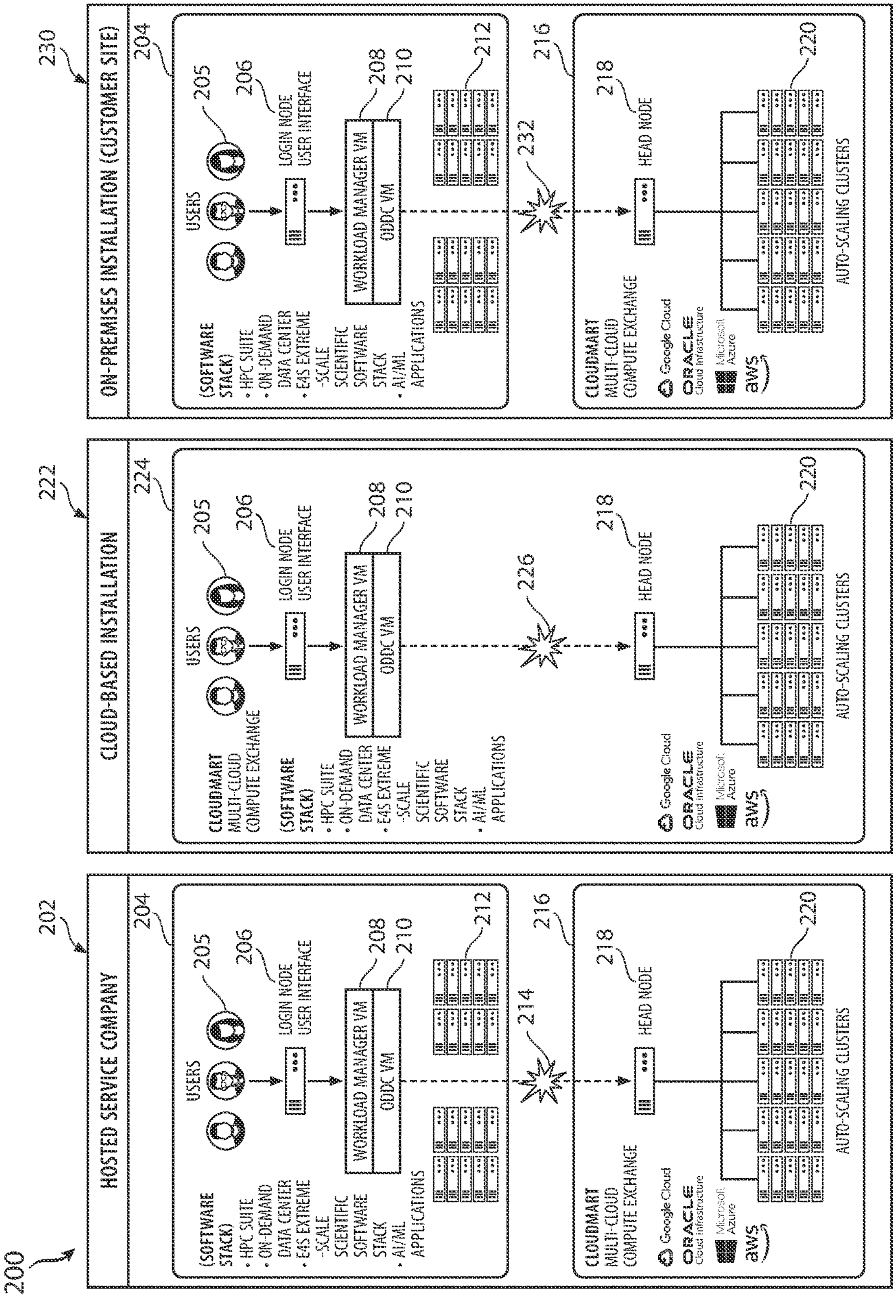
FIG. 2 illustrates a block diagram of various deployment models which can be used in connection with a compute exchange, according to some aspects of this disclosure.

FIG. 2 illustrates an example of various deployment models 200. FIG. 2 shows various configurations which can all be used in the context of where or how a compute exchange interface 104 can be configured or located. In a first aspect, the compute exchange can be configured or hosted at a service company which can be independent of any cloud service providers but may not directly be on-premises with a company having workload to process. In FIG. 2, a system 204 can include features or software modules or a software stack which can include an HPC Suite, an on-demand data center (ODDC) module, and E4S extreme-scale scientific software stake and applications such as AI/ML applications. Hardware nodes 212, a workload manager (which can be configured with a virtual machine) 208 and an ODDC virtual machine 210 can also be provided with a long node/user interface 206 for users 205 to interaction with the system 204. Here, the system 204 can also operate as a compute exchange to enable the bid/ask process to occur so that workload can be burst 214 into a cloudmart 216 which can include a head node 218 and auto-scaling clusters 220 with various cloud service providers. In some aspects, the "compute exchange" can include the system 204 and/or the cloudmart 216.

FIG. 2 also illustrates a cloud-based installation 222 in which a cloud mart or muti-cloud compute exchange 224 is installed at a cloud service provider along with a login node user interface 206 for users and a workload manager 208 and ODDC 210 with the various software stake included. Then, the "bursting" 226 can essentially be achieved all within a cloud service provider with a head node 218 and auto-scaling clusters 220.

FIG. 2 further discloses an on-premises installation 230 in which a system 204 is configured on within an on-premises compute environment and can include features or software modules or a software stack which can include an HPC Suite, an on-demand data center (ODDC) module, and E4S extreme-scale scientific software stake and applications such as AI/ML applications. Hardware nodes 212, a workload manager (which can be configured with a virtual machine) 208 and an ODDC virtual machine 210 can also be provided with a long node/user interface 206 for users 205 to interaction with the system 204. Here, the system 204 can also operate as a compute exchange to enable the bid/ask process to occur so that workload can be burst 232 into a cloudmart 216 which can include a head node 218 and auto-scaling clusters 220 with various cloud service providers. In some aspects, the "compute exchange" can include the system 204 and/or the cloudmart 216.

The formal definition of what constitutes the "compute exchange" can include any one or more of the components shown in FIG. 1 or 2.

Figure 3:
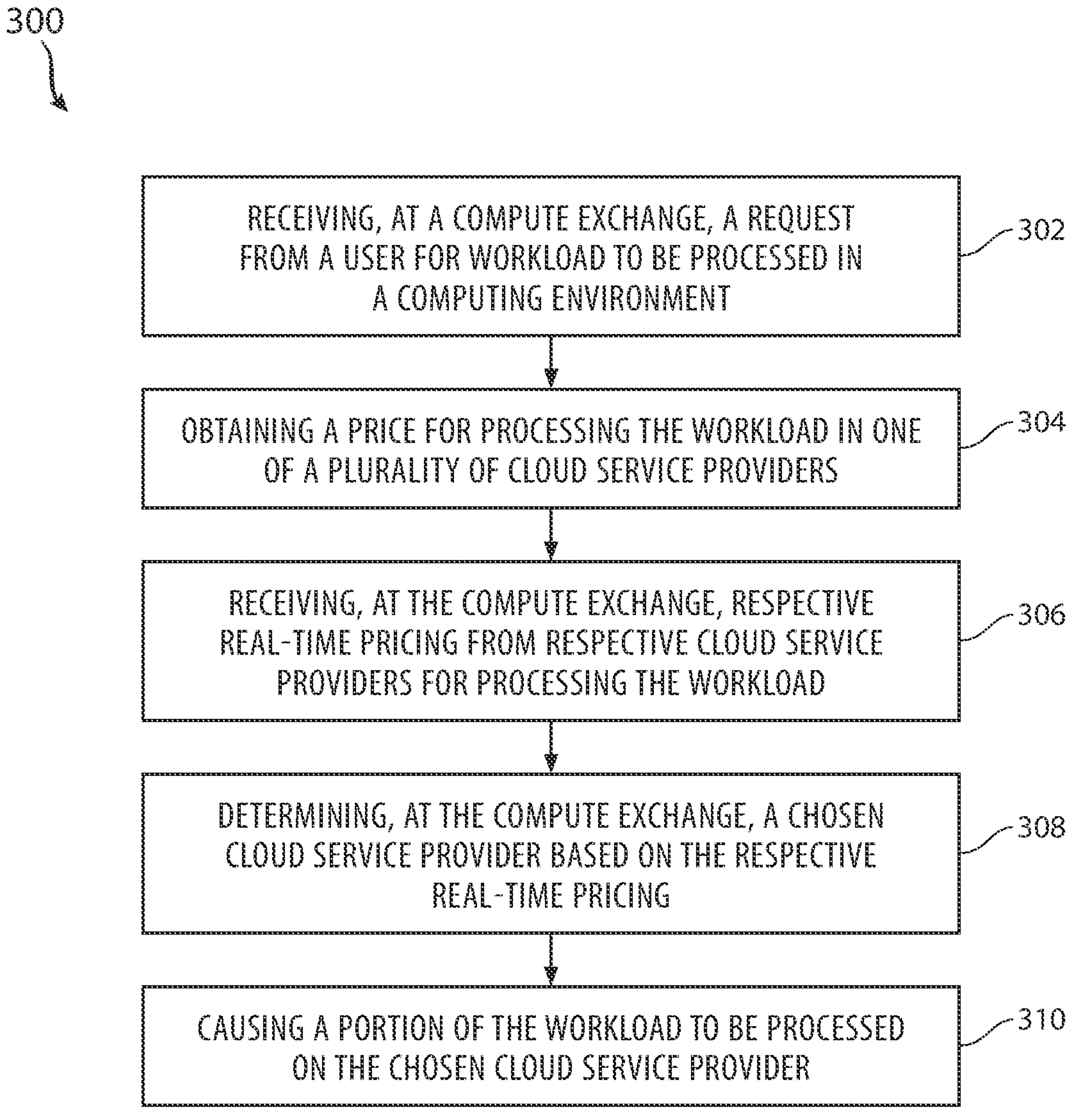
FIG. 3 illustrates an example method embodiment related to a compute exchange, according to some aspects of this disclosure.

FIG. 3 illustrates an example method 300 for operating a compute exchange. The method 300 can be performed by the compute exchange interface 104, a cloudmart 112, and/or an on-premises infrastructure 116, a computing system 500 as shown in FIG. 5, or any subsystem thereof.

Figure 5:
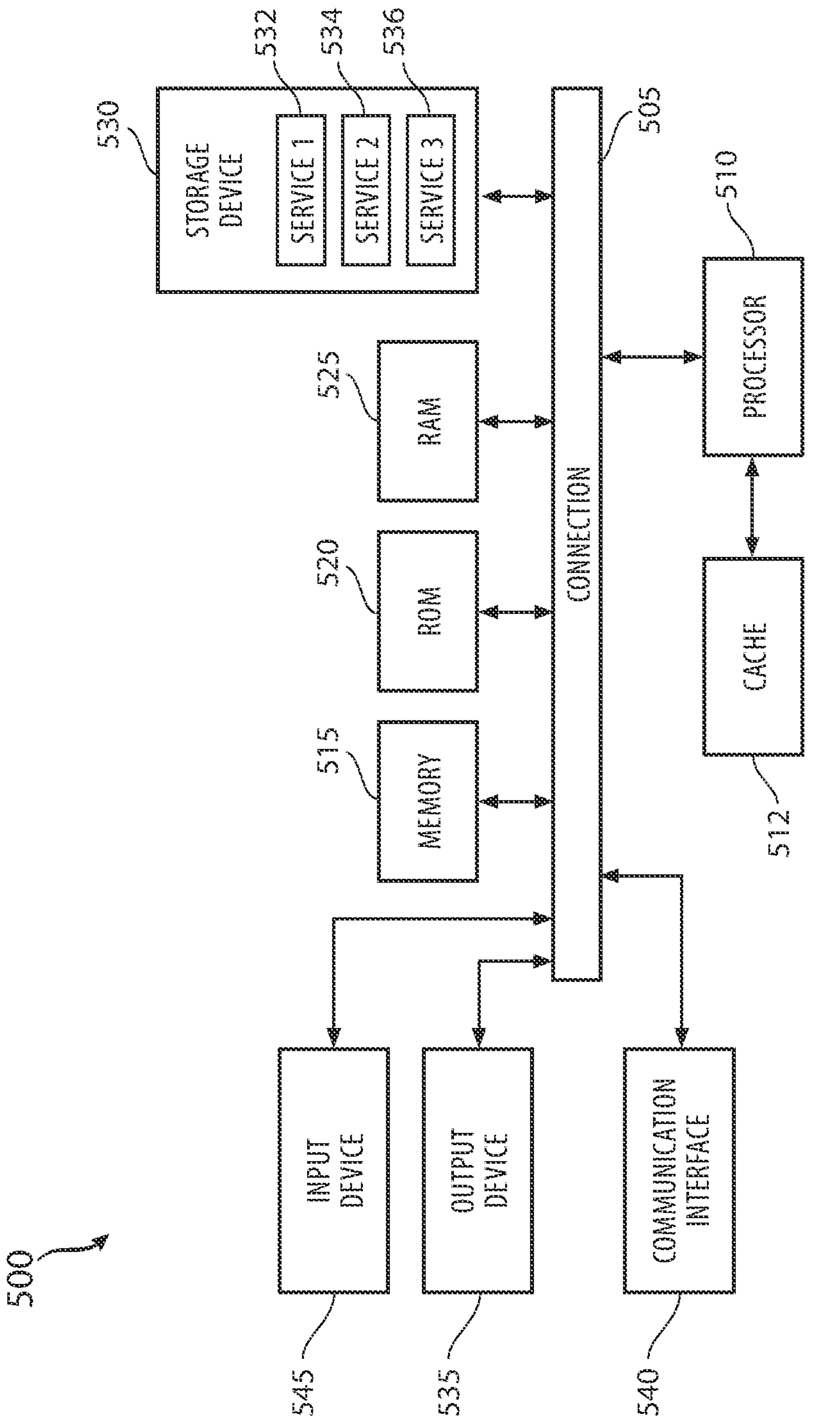
FIG. 5 illustrates a system according to some aspects of this disclosure.

At operation 302, an apparatus or system (e.g., the compute exchange interface 104, a cloudmart 112, and/or an on-premises infrastructure 116, a computing system 500 as shown in FIG. 5, or any subsystem thereof) can and does receive, at a compute exchange, a request from a user for workload to be processed in a computing environment. The compute exchange can include one or more of a workload manager, a high-performance computing suite, an on-demand data center engine and one or more applications available for the user.

At operation 304, an apparatus or system (e.g., the compute exchange interface 104, a cloudmart 112, and/or an on-premises infrastructure 116, a computing system 500 as shown in FIG. 5, or any subsystem thereof 108, the workload manager 114, the computing system 600, or at least one subsystem thereof) can and does obtain a price for processing the workload in one of a plurality of cloud service providers. The price can be obtained from the user or obtained by the compute exchange based on characteristics of the workload.

At operation 306, an apparatus or system (e.g., the compute exchange interface 104, a cloudmart 112, and/or an on-premises infrastructure 116, a computing system 500 as shown in FIG. 5, or any subsystem thereof) can and does receive, at the compute exchange, respective real-time pricing from respective cloud service providers for processing the workload. The respective real-time pricing of respective cloud compute resources can be based on a current demand or based on the price.

At operation 308, an apparatus or system (e.g., the compute exchange interface 104, a cloudmart 112, and/or an on-premises infrastructure 116, a computing system 500 as shown in FIG. 5, or any subsystem thereof) can and does determine, at the compute exchange, a chosen cloud service provider based on the respective real-time pricing. Determining the chosen cloud service provider can occur by a user selection or an automated selection by the compute exchange based on one or more parameters.

The method 300 can further include receiving characteristics of compute resources that would be offered at the respective real-time pricing. The chosen cloud service provider can be determined based on a lowest price for the respective real-time pricing or the characteristics of the compute resources even when the compute resources are not lowest priced compute resources.

In some aspects, the method 300 can include determining the chosen cloud service provider based on real-time status data about an on-premises compute environment associated with the user.

In some aspects, the method 300 can include deploying a second portion of the workload on an on-premises compute environment. In another aspect, the method 300 can include dividing up the workload into the portion of the workload and a second portion of the workload and deploying the portion of the workload on the chosen cloud service provider and deploying the second portion of the workload on a second compute environment. In some aspects, the second compute environment includes an on-premises compute environment.

In some aspects, a system for operating a compute exchange, the system includes at least one processor; and a computer-readable storage device storing instructions which, when executed by the at least one processor, cause the at least one processor to be configured to: receive, at the compute exchange, a request from a user for workload to be processed in a computing environment; obtain a price for processing the workload in one of a plurality of cloud service providers; receive, at the compute exchange, respective real-time pricing from respective cloud service providers for processing the workload; determine, at the compute exchange, a chosen cloud service provider based on the respective real-time pricing; and cause a portion of the workload to be processed on the chosen cloud service provider.

In some aspects, a computer-readable storage device stores instructions which, when executed by at least one processor, cause the at least one processor to be configured to: receive, at a compute exchange, a request from a user for workload to be processed in a computing environment; obtain a price for processing the workload in one of a plurality of cloud service providers; receive, at the compute exchange, respective real-time pricing from respective cloud service providers for processing the workload; determine, at the compute exchange, a chosen cloud service provider based on the respective real-time pricing; and cause a portion of the workload to be processed on the chosen cloud service provider.

In some aspects, a compute exchange can include means for receiving, at the compute exchange, a request from a user for workload to be processed in a computing environment; means for obtaining a price for processing the workload in one of a plurality of cloud service providers; means for receiving, at the compute exchange, respective real-time pricing from respective cloud service providers for processing the workload; means for determining, at the compute exchange, a chosen cloud service provider based on the respective real-time pricing; and means for causing a portion of the workload to be processed on the chosen cloud service provider.

Figure 4:
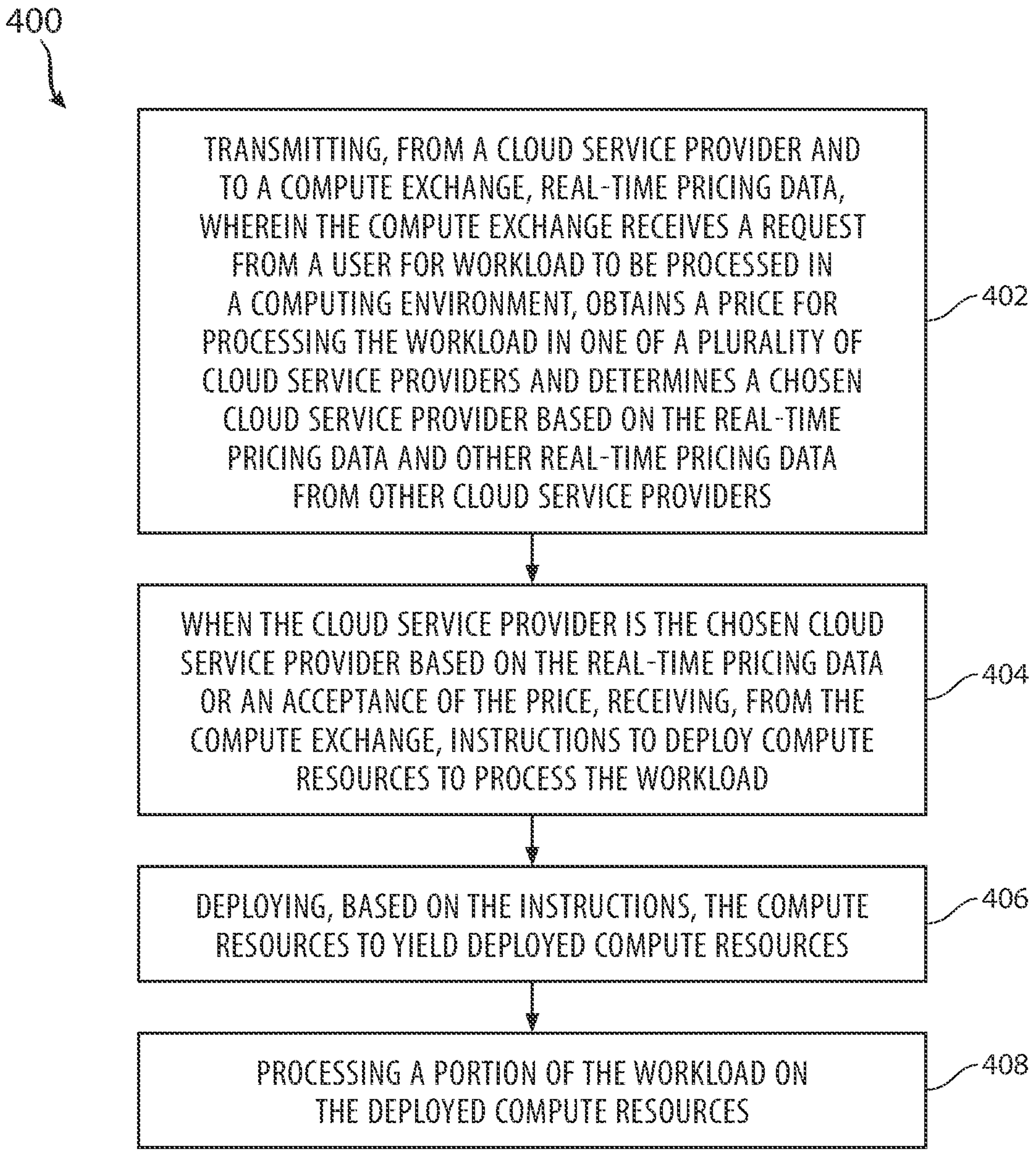
FIG. 4 illustrates a method embodiment from the standpoint of a cloud service provider, according to some aspects of this disclosure.

FIG. 4 illustrates an example method 400 for operating a compute exchange from the standpoint of a cloud service provider. The method 400 can be performed by the compute exchange interface 104, a cloudmart 112, and/or an on-premises infrastructure 116, a computing system 500 as shown in FIG. 5, or any subsystem thereof.

At operation 402, an apparatus or system (e.g., the compute exchange interface 104, a cloudmart 112, and/or an on-premises infrastructure 116, a computing system 500 as shown in FIG. 5, or any subsystem thereof) can and does transmit, from a cloud service provider and to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers. The price can be obtained from the user or obtained by the compute exchange based on characteristics of the workload.

In some aspects, the compute exchange can manage how the chosen cloud service provider is chosen by enabling a user selection or an automated selection based on one or more parameters. In some aspects, the method can include transmitting, to the compute exchange, characteristics of the compute resources that would be offered at the real-time pricing data. The chosen cloud service provider can be determined based on a lowest price or the characteristics of the compute resources even when the compute resources are not lowest priced compute resources. The compute exchange can determine the chosen cloud service provider based on real-time status data about an on-premises compute environment associated with the user.

In some aspects, the compute exchange can include one or more of: a workload manager, a high-performance computing suite, an on-demand data center engine and one or more applications available for the user.

At operation 404, an apparatus or system (e.g., the compute exchange interface 104, a cloudmart 112, and/or an on-premises infrastructure 116, a computing system 500 as shown in FIG. 5, or any subsystem thereof 108, the workload manager 114, the computing system 600, or at least one subsystem thereof) can and does, when the cloud service provider is the chosen cloud service provider based on the real-time pricing data or an acceptance of the price, receive, from the compute exchange, instructions to deploy compute resources to process the workload. The real-time pricing data of the cloud service provider can be based on a current demand or based on the price.

At operation 406, an apparatus or system (e.g., the compute exchange interface 104, a cloudmart 112, and/or an on-premises infrastructure 116, a computing system 500 as shown in FIG. 5, or any subsystem thereof) can and does deploy, based on the instructions, the compute resources to yield deployed compute resources.

At operation 408, an apparatus or system (e.g., the compute exchange interface 104, a cloudmart 112, and/or an on-premises infrastructure 116, a computing system 500 as shown in FIG. 5, or any subsystem thereof) can and does process a portion of the workload on the deployed compute resources.

The compute exchange can also divide up the workload into the portion of the workload and a second portion of the workload and cause to be deployed the portion of the workload on the chosen cloud service provider and cause to be deployed the second portion of the workload on a second compute environment. In some aspects, the compute exchange can cause to be deployed a second portion of the workload on an on-premises compute environment.

In some aspects, a system for operating a cloud service provider includes at least one processor; and a computer-readable storage device storing instructions which, when executed by the at least one processor, cause the at least one processor to be configured to: transmit, from a cloud service provider and to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; when the cloud service provider is the chosen cloud service provider based on the real-time pricing data or an acceptance of the price, receive, from the compute exchange, instructions to deploy compute resources to process the workload; deploy, based on the instructions, the compute resources to yield deployed compute resources; and process a portion of the workload on the deployed compute resources.

In some aspects, a computer-readable storage device stores instructions which, when executed by at least one processor associated with a cloud service provider, cause the at least one processor to be configured to: transmit, to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; when the cloud service provider is the chosen cloud service provider based on the real-time pricing data or an acceptance of the price, receive, from the compute exchange, instructions to deploy compute resources to process the workload; deploy, based on the instructions, the compute resources to yield deployed compute resources; and process a portion of the workload on the deployed compute resources.

In some aspects, a cloud service provider includes one or more: means for transmitting, to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; means for, when the cloud service provider is the chosen cloud service provider based on the real-time pricing data or an acceptance of the price, receiving, from the compute exchange, instructions to deploy compute resources to process the workload; means for deploying, based on the instructions, the compute resources to yield deployed compute resources; and means for processing a portion of the workload on the deployed compute resources.

FIG. 5 is a diagram illustrating an example of a system for implementing certain aspects of the present disclosure. In particular, FIG. 5 illustrates an example of computing system 500, which can be for example any computing device making up a computing system, a camera system, or any component thereof in which the components of the system are in communication with each other using connection 505. Connection 505 can be a physical connection using a bus, or a direct connection into processor 512, such as in a chipset architecture. Connection 505 can also be a virtual connection, networked connection, or logical connection.

In some examples, computing system 500 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 512. Computing system 500 can include a cache 511 of high-speed memory connected directly with, in close proximity to, or integrated as part of processor 512.

Processor 512 can include any general purpose processor and a hardware service or software service, such as services 532, 534, and 536 stored in storage device 530, configured to control processor 512 as well as a special-purpose processor where software instructions are incorporated into the actual processor design. Processor 512 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms. In some instances, multimodal systems can enable a user to provide multiple types of input/output to communicate with computing system 500. Computing system 500 can include communications interface 540, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1202.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hard ware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 530 can include software services, servers, services, etc., that when the code that defines such software is executed by the processor 512, it causes the system to perform a function. In some examples, a hardware service that performs a particular function can include the software component stored in a computer-readable medium in connection with the necessary hardware components, such as processor 512, connection 505, output device 535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

The present disclosure incorporates by reference the paper included as Appendix A.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, then the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Claim clauses of this application include:

Clause 1. A method comprising: receiving, at a compute exchange, a request from a user for workload to be processed in a computing environment; obtaining a price for processing the workload in one of a plurality of cloud service providers; receiving, at the compute exchange, respective real-time pricing from respective cloud service providers for processing the workload; determining, at the compute exchange, a chosen cloud service provider based on the respective real-time pricing; and causing a portion of the workload to be processed on the chosen cloud service provider.

Clause 2. The method of clause 1, wherein the price is obtained from the user or obtained by the compute exchange based on characteristics of the workload.

Clause 3. The method of clause 1 or any previous claim, wherein the respective real-time pricing of respective cloud compute resources based on a current demand or based on the price.

Clause 4. The method of clause 1 or any previous claim, wherein determining the chosen cloud service provider occurs by a user selection or an automated selection by the compute exchange based on one or more parameters.

Clause 5. The method of clause 1 or any previous claim, further comprising: receiving characteristics of compute resources that would be offered at the respective real-time pricing, wherein the chosen cloud service provider is determined based on a lowest price for the respective real-time pricing or the characteristics of the compute resources even when the compute resources are not lowest priced compute resources.

Clause 6. The method of clause 1 or any previous claim, further comprising: determining the chosen cloud service provider based on real-time status data about an on-premises compute environment associated with the user.

Clause 7. The method of clause 1 or any previous claim, wherein the compute exchange comprises: a workload manager, a high-performance computing suite, an on-demand data center engine and one or more applications available for the user.

Clause 7. The method of clause 1 or any previous claim, further comprising: deploying a second portion of the workload on an on-premises compute environment.

Clause 8. The method of clause 1 or any previous claim, further comprising: dividing up the workload into the portion of the workload and a second portion of the workload; and deploying the portion of the workload on the chosen cloud service provider and deploying the second portion of the workload on a second compute environment.

Clause 9. The method of clause 8 or any previous claim, wherein the second compute environment comprises an on-premises compute environment.

Clause 10. A system for operating a compute exchange, the system comprising: at least one processor; and a computer-readable storage device storing instructions which, when executed by the at least one processor, cause the at least one processor to be configured to: receive, at the compute exchange, a request from a user for workload to be processed in a computing environment; obtain a price for processing the workload in one of a plurality of cloud service providers; receive, at the compute exchange, respective real-time pricing from respective cloud service providers for processing the workload; determine, at the compute exchange, a chosen cloud service provider based on the respective real-time pricing; and cause a portion of the workload to be processed on the chosen cloud service provider.

Clause 11. The system of clause 10 or any previous claim, wherein the price is obtained from the user or obtained by the compute exchange based on characteristics of the workload.

Clause 12. The system of clause 10 or any previous claim, wherein the respective real-time pricing of respective cloud compute resources based on a current demand or based on the price.

Clause 13. The system of clause 10 or any previous claim, wherein determining the chosen cloud service provider occurs by a user selection or an automated selection by the compute exchange based on one or more parameters.

Clause 14. The system of clause 10 or any previous claim, wherein the computer-readable storage device stores further instructions which, when executed by the at least one processor, cause the at least one processor to be configured to: receive characteristics of compute resources that would be offered at the respective real-time pricing, wherein the chosen cloud service provider is determined based on a lowest price for the respective real-time pricing or the characteristics of the compute resources even when the compute resources are not lowest priced compute resources.

Clause 15. The system of clause 10 or any previous claim, wherein the computer-readable storage device stores further instructions which, when executed by the at least one processor, cause the at least one processor to be configured to: determine the chosen cloud service provider based on real-time status data about an on-premises compute environment associated with the user.

Clause 16. The system of clause 10 or any previous claim, wherein the compute exchange comprises: a workload manager, a high-performance computing suite, an on-demand data center engine and one or more applications available for the user.

Clause 17. The system of clause 10 or any previous claim, wherein the computer-readable storage device stores further instructions which, when executed by the at least one processor, cause the at least one processor to be configured to: deploy a second portion of the workload on an on-premises compute environment.

Clause 18. The system of clause 10 or any previous claim, wherein the computer-readable storage device stores further instructions which, when executed by the at least one processor, cause the at least one processor to be configured to: divide up the workload into the portion of the workload and a second portion of the workload; and deploy the portion of the workload on the chosen cloud service provider and deploying the second portion of the workload on a second compute environment.

Clause 19. The system of clause 18 or any previous claim, wherein the second compute environment comprises an on-premises compute environment.

Clause 20. A computer-readable storage device storing instructions which, when executed by at least one processor, cause the at least one processor to be configured to: receive, at a compute exchange, a request from a user for workload to be processed in a computing environment; obtain a price for processing the workload in one of a plurality of cloud service providers; receive, at the compute exchange, respective real-time pricing from respective cloud service providers for processing the workload; determine, at the compute exchange, a chosen cloud service provider based on the respective real-time pricing; and cause a portion of the workload to be processed on the chosen cloud service provider.

Clause 21. A compute exchange comprising: means for receiving, at the compute exchange, a request from a user for workload to be processed in a computing environment; means for obtaining a price for processing the workload in one of a plurality of cloud service providers; means for receiving, at the compute exchange, respective real-time pricing from respective cloud service providers for processing the workload; means for determining, at the compute exchange, a chosen cloud service provider based on the respective real-time pricing; and means for causing a portion of the workload to be processed on the chosen cloud service provider.

Clause 22. A method comprising: transmitting, from a cloud service provider and to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; when the cloud service provider is the chosen cloud service provider based on the real-time pricing data or an acceptance of the price, receiving, from the compute exchange, instructions to deploy compute resources to process the workload; deploying, based on the instructions, the compute resources to yield deployed compute resources; and processing a portion of the workload on the deployed compute resources.

Clause 23. The method of clause 22, wherein the price is obtained from the user or obtained by the compute exchange based on characteristics of the workload.

Clause 24. The method of clause 22 or any previous claim, wherein the real-time pricing data of the cloud service provider is based on a current demand or based on the price.

Clause 25. The method of clause 22 or any previous claim, wherein the compute exchange manages how the chosen cloud service provider is chosen by enabling a user selection or an automated selection based on one or more parameters.

Clause 26. The method of clause 22 or any previous claim, further comprising: transmitting, to the compute exchange, characteristics of the compute resources that would be offered at the real-time pricing data, wherein the chosen cloud service provider is determined based on a lowest price or the characteristics of the compute resources even when the compute resources are not lowest priced compute resources.

Clause 27. The method of clause 22 or any previous claim, wherein the compute exchange determines the chosen cloud service provider based on real-time status data about an on-premises compute environment associated with the user.

Clause 28. The method of clause 22 or any previous claim, wherein the compute exchange comprises: a workload manager, a high-performance computing suite, an on-demand data center engine and one or more applications available for the user.

Clause 29. The method of clause 22 or any previous claim, wherein the compute exchange causes to be deployed a second portion of the workload on an on-premises compute environment.

Clause 30. The method of clause 22 or any previous claim, wherein the compute exchange divides up the workload into the portion of the workload and a second portion of the workload; and causes to be deployed the portion of the workload on the chosen cloud service provider and causes to be deployed the second portion of the workload on a second compute environment.

Clause 31. The method of clause 30 or any previous claim, wherein the second compute environment comprises an on-premises compute environment.

Clause 32. A system for operating a cloud service provider, the system comprising: at least one processor; and a computer-readable storage device storing instructions which, when executed by the at least one processor, cause the at least one processor to be configured to: transmit, from a cloud service provider and to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; when the cloud service provider is the chosen cloud service provider based on the real-time pricing data or an acceptance of the price, receive, from the compute exchange, instructions to deploy compute resources to process the workload; deploy, based on the instructions, the compute resources to yield deployed compute resources; and process a portion of the workload on the deployed compute resources.

Clause 33. The system of clause 32, wherein the price is obtained from the user or obtained by the compute exchange based on characteristics of the workload.

Clause 34. The system of clause 32 or any previous claim, wherein the real-time pricing data of the cloud service provider is based on a current demand or based on the price.

Clause 35. The system of clause 32 or any previous claim, wherein the compute exchange manages how the chosen cloud service provider is chosen by enabling a user selection or an automated selection based on one or more parameters.

Clause 36. The system of clause 32 or any previous claim, wherein the computer-readable storage device stores additional instructions which, when executed by the at least one processor, cause the at least one processor to be configured to: transmit, to the compute exchange, characteristics of the compute resources that would be offered at the real-time pricing data, wherein the chosen cloud service provider is determined based on a lowest price or the characteristics of the compute resources even when the compute resources are not lowest priced compute resources.

Clause 37. The system of clause 32 or any previous claim, wherein the compute exchange determines the chosen cloud service provider based on real-time status data about an on-premises compute environment associated with the user.

Clause 38. The system of clause 32 or any previous claim, wherein the compute exchange comprises: a workload manager, a high-performance computing suite, an on-demand data center engine and one or more applications available for the user.

Clause 39. The system of clause 32 or any previous claim, wherein the compute exchange causes to be deployed a second portion of the workload on an on-premises compute environment.

Clause 40. The system of clause 32 or any previous claim, wherein the compute exchange divides up the workload into the portion of the workload and a second portion of the workload; and causes to be deployed the portion of the workload on the chosen cloud service provider and causes to be deployed the second portion of the workload on a second compute environment.

Clause 41. The system of clause 40 or any previous claim, wherein the second compute environment comprises an on-premises compute environment.

Clause 42. A computer-readable storage device storing instructions which, when executed by at least one processor associated with a cloud service provider, cause the at least one processor to be configured to: transmit, to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; when the cloud service provider is the chosen cloud service provider based on the real-time pricing data or an acceptance of the price, receive, from the compute exchange, instructions to deploy compute resources to process the workload; deploy, based on the instructions, the compute resources to yield deployed compute resources; and process a portion of the workload on the deployed compute resources.

Clause 43. A cloud service provider comprising: means for transmitting, to a compute exchange, real-time pricing data, wherein the compute exchange receives a request from a user for workload to be processed in a computing environment, obtains a price for processing the workload in one of a plurality of cloud service providers and determines a chosen cloud service provider based on the real-time pricing data and other real-time pricing data from other cloud service providers; means for, when the cloud service provider is the chosen cloud service provider based on the real-time pricing data or an acceptance of the price, receiving, from the compute exchange, instructions to deploy compute resources to process the workload; means for deploying, based on the instructions, the compute resources to yield deployed compute resources; and means for processing a portion of the workload on the deployed compute resources.

What is claimed is:

1. A method comprising:

receiving, at a compute exchange, a request from a user for workload to be processed in an on-premises computing environment;

receiving, at the compute exchange, respective real-time pricing from respective cloud service providers for processing the workload;

receiving, at the compute exchange from the on-premises computing environment, real-time status data indicating availability of compute resources within the on-premises computing environment;

determining, at the compute exchange, for the workload and before dividing the workload into a first portion of the workload and a second portion of the workload, a first chosen cloud service provider based on the respective real-time pricing and a second chosen cloud service provider based on the respective real-time pricing, wherein the first chosen cloud service provider is different from the second chosen cloud service provider;

dividing, after determining the first chosen cloud service provider and the second chosen cloud service provider and according to an allocation of the workload among the first chosen cloud service provider and the second chosen cloud service provider, based on one or more parameters associated with one or more of the respective real-time pricing and characteristics of compute resources in the first chosen cloud service provider or the second chosen cloud service provider, and further based on real-time status data from the on-premises computing environment, the workload into the first portion of the workload and the second portion of the workload, wherein the allocation is based at least in part on the availability of compute resources within the on-premises computing environment;

causing the first portion of the workload to be processed on the first chosen cloud service provider; and causing the second portion of the workload to be processed on the second chosen cloud service provider.

2. The method of claim 1, wherein a price for processing the workload is obtained from the user or obtained by the compute exchange based on characteristics of the workload.

3. The method of claim 1, wherein the respective real-time pricing of respective cloud compute resources based on a current demand.

4. The method of claim 1, wherein determining the first chosen cloud service provider occurs by a user selection or an automated selection by the compute exchange based on the one or more parameters.

5. The method of claim 1, further comprising:

receiving characteristics of compute resources that would be offered at the respective real-time pricing, wherein the first chosen cloud service provider and the second chosen cloud service provider are determined based on a lowest price for the respective real-time pricing or the characteristics of the compute resources even when the compute resources are not lowest priced compute resources.

6. The method of claim 1, wherein the compute exchange comprises: a workload manager, a high-performance computing suite, an on-demand data center engine and one or more applications available for the user and wherein the method further comprises deploying a third portion of the workload on an on-premises compute environment.

7. A system for operating a compute exchange, the system comprising:

at least one processor; and a computer-readable storage device storing instructions which, when executed by the at least one processor, cause the at least one processor to be configured to:

receive a request from a user for workload to be processed in an on-premises computing environment;

receive respective real-time pricing from respective cloud service providers for processing the workload;

receive, from the on-premises computing environment, real-time status data indicating availability of compute resources within the on-premises computing environment;

determine, for the workload and before dividing the workload into a first portion of the workload and a second portion of the workload, a first chosen cloud service provider based on the respective real-time pricing and a second chosen cloud service provider based on the respective real-time pricing, wherein the first chosen cloud service provider is different from the second chosen cloud service provider;

divide, after determining the first chosen cloud service provider and the second chosen cloud service provider and according to an allocation of the workload among the first chosen cloud service provider and the second chosen cloud service provider, based on one or more parameters associated with one or more of the respective real-time pricing and characteristics of compute resources in the first chosen cloud service provider or the second chosen cloud service provider, and further based on real-time status data from the on-premises computing environment, the workload into the first portion of the workload and the second portion of the workload, wherein the allocation is based at least in part on the availability of compute resources within the on-premises computing environment;

cause the first portion of the workload to be processed on the first chosen cloud service provider; and cause the second portion of the workload to be processed on the second chosen cloud service provider.

8. The system of claim 7, wherein a price is obtained from the user or obtained by the compute exchange based on characteristics of the workload.

9. The system of claim 7, wherein the respective real-time pricing of respective cloud compute resources based on a current demand.

10. The system of claim 7, wherein determining the first chosen cloud service provider occurs by a user selection or an automated selection by the compute exchange based on the one or more parameters.

11. The system of claim 7, wherein the computer-readable storage device stores further instructions which, when executed by the at least one processor, cause the at least one processor to be configured to:

receive characteristics of compute resources that would be offered at the respective real-time pricing, wherein the first chosen cloud service provider and the second chosen cloud service provider are determined based on a lowest price for the respective real-time pricing or the characteristics of the compute resources even when the compute resources are not lowest priced compute resources.

12. The system of claim 7, wherein the compute exchange comprises: a workload manager, a high-performance computing suite, an on-demand data center engine and one or more applications available for the user and wherein the system is further configured to deploy a third portion of the workload on an on-premises compute environment.

13. The system of claim 7, wherein the computer-readable storage device stores further instructions which, when executed by the at least one processor, cause the at least one processor to be configured to:

deploy a third portion of the workload on an on-premises compute environment.

14. A computer-readable storage device storing instructions which, when executed by at least one processor, cause the at least one processor to be configured to:

receive, at a compute exchange, a request from a user for workload to be processed in an on-premises computing environment;

receive respective real-time pricing from respective cloud service providers for processing the workload;

receiving, at the compute exchange from the on-premises computing environment, real-time status data indicating availability of compute resources within the on-premises computing environment;

determine for the workload and before dividing the workload into a first portion of the workload and a second portion of the workload, a first chosen cloud service provider based on the respective real-time pricing and a second chosen cloud service provider based on the respective real-time pricing, wherein the first chosen cloud service provider is different from the second chosen cloud service provider;

divide, after determining the first chosen cloud service provider and the second chosen cloud service provider and according to an allocation of the workload among the first chosen cloud service provider and the second chosen cloud service provider, based on one or more parameters associated with one or more of the respective real-time pricing and characteristics of compute resources in the first chosen cloud service provider or the second chosen cloud service provider, and further based on real-time status data from the on-premises computing environment, the workload into the first portion of the workload and the second portion of the workload, wherein the allocation is based at least in part on the availability of compute resources within the on-premises computing environment;

cause the first portion of the workload to be processed on the first chosen cloud service provider; and cause the second portion of the workload to be processed on the second chosen cloud service provider.

15. A compute exchange comprising:

means for receiving, at the compute exchange, a request from a user for workload to be processed in an on-premises computing environment;

means for receiving, at the compute exchange, respective real-time pricing from respective cloud service providers for processing the workload;

means for receiving, at the compute exchange from the on-premises computing environment, real-time status data indicating availability of compute resources within the on-premises computing environment;

means for determining, at the compute exchange, for the workload and before dividing the workload into a first portion of the workload and a second portion of the workload, a first chosen cloud service provider based on the respective real-time pricing and a second chosen cloud service provider based on the respective real-time pricing, wherein the first chosen cloud service provider is different from the second chosen cloud service provider;

means for dividing, after determining the first chosen cloud service provider and the second chosen cloud service provider and according to an allocation of the workload among the first chosen cloud service provider and the second chosen cloud service provider, based on one or more parameters associated with one or more of the respective real-time pricing and characteristics of compute resources in the first chosen cloud service provider or the second chosen cloud service provider, and further based on real-time status data from the on-premises computing environment, the workload into the first portion of the workload and the second portion of the workload, wherein the allocation is based at least in part on the availability of compute resources within the on-premises computing environment;

means for causing the first portion of the workload to be processed on the first chosen cloud service provider; and means for causing the second portion of the workload to be processed on the second chosen cloud service provider.

* * * * *